United States Patent Office 3,057,870
Patented Oct. 9, 1962

3,057,870
NEW DYESTUFFS
Eduard Moser, Basel, Switzerland, assignor to Ciba Limited, Basel, Switzerland, a company of Switzerland
No Drawing. Filed Nov. 21, 1960, Ser. No. 70,373
Claims priority, application Switzerland Nov. 26, 1959
9 Claims. (Cl. 260—295)

This invention provides dyestuffs of the general formula (1)

$$[\text{structure with } (R_1)_m, (R_2)_n, (R_3)_p, (R_4)_q \text{ groups} - C-CONH-B-NHCO-C-]$$

in which $R_1$, $R_2$, $R_3$ and $R_4$ each represent a hydrogen atom or a substituent not imparting solubility in water and any two of which substituents bound in ortho-position relatively to one another may form a ring together with the vicinal carbon atoms of the skeleton structure, $m$, $n$, $p$, and $q$ each represent the whole number 1 or 2, and $B$ represents a diphenyl radical free from groups imparting solubility in water.

The invention also provides a process for the manufacture of the dyestuffs of the general Formula 1, wherein two molecular proportions of a halide of a 2:3-phthaloyl-pyrrocoline-1 carboxylic acid of the formula (2)

$$[\text{structure with numbered positions 1-8, } (R_1)_m, (R_2)_n, (R_3)_p, (R_4)_q - C-COOH]$$

(the nomenclature in the pyrrocoline ring is according to Patterson's Ring Index), in which formula $R_1$, $R_2$, $R_3$ and $R_4$, and $m$, $n$, $p$ and $q$ have the meanings given above, is condensed with one molecular proportion of a diamino-diphenyl free from groups imparting solubility in water.

In the phthaloyl-pyrrocoline carboxylic acids of the Formula 2 $R_3$ and $R_4$ each preferably represent a hydrogen atom or a simple substituent, such as a halogen atom or a lower alkyl group, and $R_1$ and $R_2$ each preferably represent a hydrogen atom or a halogen atom, for example, chlorine or bromine.

The 2:3-phthaloyl-pyrrocoline carboxylic acids of the Formula 2 can be obtained, for example, by the process described in United States Patent No. 2,877,230 granted March 10, 1959 to Robert S. Long et al. by condensing a 2:3-dichloro-naphthoquinone with an acetoacetic acid alkyl ester and pyridine or a substitution product thereof, for example, α-picoline, and hydrolysing the resulting alkyl ester to form the carboxylic acid. As suitable naphthoquinones there may be mentioned more especially, on account of the ease with which it can be obtained, 2:3-dichloro-naphthoquinone. There may also be mentioned 2:3:5- or 2:3:6-trichloro-naphthoquinone, 2:3-dibromo-naphthoquinone and 2:3:6:7-tetrabromonaphthoquinone.

There are advantageously used chlorides of 2:3-phthaloyl-pyrrocoline carboxylic acids. These chlorides can be obtained in known manner by treating the appropriate carboxylic acid with an acid-chlorinating agent, for example, phosphorus trichloride, phosphorus pentachloride or phosphorus oxychloride, and especially thionyl chloride.

The treatment with the acid-chlorinating agent is advantageously carried out in an inert organic solvent, such as dimethyl-formamide, a chlorobenzene, for example, monochloro- or dichloro-benzene, toluene, xylene or nitrobenzene. When the last-mentioned solvent is used, the reaction can be accelerated by the addition of a small amount of dimethyl-formamide.

For making the carboxylic acid halides it is generally of advantage first to dry the carboxylic acid, which has been made in an aqueous medium, or to free it from water azeotropically by boiling it in an organic solvent. This azeotropic drying may, if desired, be carried out immediately before the acid is treated with the acid-chlorinating agent.

As the diamino-diphenyls there are advantageously used those of the formula (3)

$$H_2N-\text{[benzene-}(X)_{u-1}(Y)_{v-1}\text{]-[benzene-}(X)_{u-1}(Y)_{v-1}\text{]}-NH_2$$

in which X represents a halogen atom or an alkoxy or nitro group, Y represents a lower alkyl group, and $u$ and $v$ each represent the whole number 1, 2 or 3, and $u$ is advantageously at least as large as $v$. At least one substituent in each benzene nucleus is preferably in ortho-position to the amino group. Of special interest are diphenyls of the formula $$H_2N-\text{[benzene-}X_1\text{]}-\text{[benzene-}X_1\text{]}-NH_2$$

in which $X_1$ represents a hydrogen atom or a halogen atom or an alkoxy or nitro group.

As examples there may be mentioned
4:4'-diamino-diphenyl,
4:4'-diamino-3:3'-dichlorodiphenyl,
4:4'-diamino-3:3'-dimethoxydiphenyl,
4:4'-diamino-3:3'-dinitrodiphenyl,
4:4'-diamino-3:3'-dimethoxy-6:6'-dichlorophenyl,
4:4'-diamino-3:3'-dichloro-5:5'-dimethyldiphenyl and
4:4'-diamino-3:3':5:5'-tetrachlorodiphenyl.

The condensation of the phthaloyl-pyrrocoline carboxylic acid halides with the diamines is advantageously carried out in an anhydrous medium. In this case the condensation generally takes place surprisingly easily at temperatures within the boiling ranges of the ordinary inert organic solvents, such as toluene, monochloro-benzene, dichloro-benzene, trichloro-benzene, nitro-benzene and the like. In order to accelerate the reaction there may be used an acid-binding agent, such as anhydrous sodium acetate, pyridine or anhydrous ammonia. The dyestuffs are generally obtained in very good yields and in a pure state. It may be of advantage in order to obtain especially pure dyestuffs to precipitate the acid chloride obtained from the carboxylic acid and, if desired, to recrystallize the acid chloride. In most cases, especially when thionyl chloride is used as acid-chlorinating agent, the precipitation of the acid chloride can be dispensed with without harm, and in some cases even with better results, and the condensation carried out immediately following the preparation of the carboxylic acid chloride.

The dyestuffs of the invention are useful for dyeing a very wide variety of materials, for example, they are useful as vat dyestuffs for dyeing cellulose fibers or animal fibers, such as wool or silk, or synthetic fibers, such as polyamide or polyester fibers. The dyestuffs of the invention may be sulfonated and used in that state for dyeing the aforesaid fibers, especially animal fibers. They are also suitable for use as pigments in all applications for which pigments are used, for example, in so-called pigment printing that is to say, the method of printing in which a pigment is fixed on a substratem, especially on a textile fiber, or on other flat structures, such as paper, for example, wallpaper, or fabrics of glass fibers, by means of a suitable adhesive, such as casein, a hardenable synthetic product, especially a urea- or melamine-formaldehyde condensation product, a solution or emulsion of polyvinyl chloride or polyvinyl acetate or other emulsion, for example, an oil-in-water or water-in-oil emulsion. The pigments of the invention can also be used for other purposes, for example, in a finely dispersed form for dyeing in the spinning mass rayon of viscose or of a cellulose ether or ester or of a polyamide or polyurethane. They are also very useful for the manufacture of colored lacquers or lacquer formers, solutions or products of acetyl-cellulose, nitrocellulose, natural resins or synthetic resins, such as polymerization resins, for example, polyvinyl chloride or polystyrene, or condensation resins, for example, aminoplasts, phenoplasts, polyethylene, polystyrene, gums, casein, silicones or silicone resins. They are also of advantage in the manufacture of colored pencils, cosmetic preparations and laminated sheets.

The pigments of this invention, owing to other chemical inertness and good resistance to temperature, can be dispersed in the normal manner in compositions or products of the kind mentioned above, and this is advantageously carried out before the compositions of products have reached their final form. The pigments can be converted into a finely dispersed form by the known conditioning methods. The method required for shaping such as spinning, compressing, hardening, casting, sticking or the like, can be carried out in the presence of the pigments.

The pigments of this invention are distinguished by their excellent properties of fastness to light and migration.

The following examples illustrate the invention, the parts and percentages being by weight:

*Example 1*

30.9 parts of 2:3-phthaloyl-pyrrocoline-1-carboxylic acid chloride (obtained in the manner described in U.S. Patent No. 2,877,230 granted March 10, 1959 to Robert S. Long et al. by heating 2:3-dichloro- or dibromo-naphthoquinone, acetoacetic acid ester and pyridine, hydrolysing the resulting 2:3-phthalyl-pyrrocoline-1-carboxylic acid ethyl ester to form the carboxylic acid, and reacting the latter with thionyl chloride) are suspended in 750 parts of anhydrous ortho-dichlorobenzene at 115° C., there is obtained after about 20 minutes a clear solution. Into the solution is poured in the course of about five minutes a solution, having a temperature of 100° C., of 12.7 parts of 4:4'-diamino-3:3'-dichloro diphenyl in 100 parts of anhydrous ortho-dichloro benzene and 2.5 parts of anhydrous pyridine. The whole is heated to 140 to 145° C., and that temperature is maintained for about 10 hours. The whole is then cooled to 100° C., it is filtered, and the pigment so obtained is washed with ortho-dichlorobenzene at 100° C. until the washings are practically colorless. The pigment is then washed with a small proportion of cold methanol and then with hot water. The pigment so obtained is dried in vacuo at 90 to 100° C. The pigment when incorporated in sheets of polyvinyl chloride yields a yellowish-red tint of good fastness to migration and light.

The pigment obtained with a 4:4'-diamino-3:3'-dimethoxy diphenyl yields polyvinyl chloride sheets having a reddish-blue tint, the pigment obtained with 4:4'-diamino-2-nitrodiphenyl yields a neutral red tint and the pigment prepared with 4:4'-diamino-3:3'-dinitro diphenyl yields an orange tint.

*Example 2*

29.1 parts of 2:3-phthaloyl-pyrrocoline-1-carboxylic acid are heated in 750 parts of anhydrous ortho-dichlorobenzene and 40.8 parts of thionyl chloride in the course of about 40 minutes to 130° C. and the mixture is maintained at 130 to 135° C. for two hours. Into the resulting solution of the acid chloride is poured in the course of about five minutes a solution, having a temperature of 120° C., of 12.65 parts of 3:3'-dichloro-4:4'-diamino diphenyl in 150 parts of anhydrous ortho-dichloro benzene and 2:5 parts of anhydrous pyridine. The whole is heated to 140° C. and that temperature is maintained for about 10 hours. The whole is then allowed to cool to 100° C., the precipitated pigment is filtered off, and the latter is washed with ortho-dichlorobenzene at 100° C. until the washings are practically colorless. The pigment is then washed with a small amount of methanol and with hot water. The pigment is dried in vacuo at 90 to 100° C. There is obtained a pigment having the same properties as the pigment obtained as described in Example 1.

*Example 3*

34.4 parts of 4'- or 5'-chloro-2:3-phthaloyl-pyrrocoline carboxylic acid chloride, dissolved in 750 parts of anhydrous ortho-dichlorobenzene at 115° C., are mixed with a solution of 12.2 parts of 3:3'-dimethoxy-4:4'-diamino-diphenyl, dissolved in 150 parts of anhydrous ortho-dichloro-benezene, and 2.5 parts of anhydrous pyridine at 120° C. The pigment so obtained colors polyvinyl chloride sheets grey tints of good fastness to migration.

By using, instead of 3:3'-dimethoxy-4:4'-diamino diphenyl, an equivalent quantity of 4:4'-diamino diphenyl there is obtained a pigment which when rolled into polyvinyl chloride sheets produces a violet tint. By using in a similar manner the pigment obtained with 3:3'-dichloro-4:4'-diamino-diphenyl, there is obtained a reddish-violet tint, the pigment obtained with 3:3'-dinitro-4:4'-diamino diphenyl yields a scarlet tint and the pigment obtained with 3:3'-dimethoxy-6:6'-dichloro-4:4'-diamino diphenyl yields a violet tint.

*Example 4*

65 parts of polyvinyl chloride, 35 parts of dioctylphthalate and 0.2 part of the pigment, obtained as described in the first paragraph of Example 1, are stirred together and the mixture is rolled to and fro in a two-roller calender for 7 minutes at 145° C. There is obtained a yellowish-red sheet of good fastness to light and migration. By using, in addition to the aforesaid quantity of pigment, five parts of titanium dioxide there is obtained a yellowish-red pastel tint.

*Example 5*

0.25 part of the dyestuff as described in the first paragraph of Example 1 is ground for 24 hours in a rod mill with 40 parts of an alkyd-melamine bakeable lacquer, which contains 50% of solid matter, and 4.75 parts of titanium dioxide. The lacquer so obtained is brushed in the form of a thin coating on a sheet of aluminum, and the coating is baked for one hour at 120° C. There is obtained a yellowing-red coating of good fastness to light.

*Example 6*

The following separate layers are prepared for making a laminate:

(a) Strong paper of unbleached sulfate cellulose (so called kraft paper) is impregnated with an aqueous solution of a phenol-formaldehyde resin, and then pressed and dried.

(b) Paper of pure chemically bleached cellulose containing zinc sulfide or titanium dioxide as filler is impregnated with an aqueous solution of dimethylol-melamine of 50% strength, then pressed and dried at 100° C.

(c) 400 parts of decoration paper of bleached cellulose containing zinc sulfide or titanium dioxide as filler are disintegrated in a Hollander with 10,000 parts of water. To the paper pulp so obtained there are added 30 parts of a pigment obtained as described in Example 1. The pigment is fixed by the addition of 16 parts of aluminum sulfate. The colored decoration paper is impregnated in an aqueous solution of dimethylol-melamine of 50% strength and then pressed and dried at 100° C.

(d) Depending on the quality of the laminate to be produced, the decoration paper may be protected with tissue-paper of bleached special cellulose, the tissue-paper weighing 40 grams per square meter. The tissue-paper is also impregnated with an aqueous solution of dimethylol-melamine of 50% strength, then pressed and dried at 100° C.

Sheets of the materials prepared as described above being the same size, for example, measuring 2.75 meters by 1.25 meters, are placed one upon the other as follows: First 3 to 5 layers of paper (a) then one layer of paper (b) one layer of paper (c) and, if desired, a layer of paper (d). The assembly is pressed between highly glossy chromium plated plates for 12 minutes at 140° to 150° C. under a pressure of 100 kilograms per square cm. The assembly is then cooled to 30° C. and the resulting laminate is removed from the press. The laminate has on one side a scarlet-red coloration of good fastness to light.

*Example 7*

1 part of the dyestuff obtained as described in Example 3 with the use of 4:4′-diamino diphenyl as diamine is vatted in 100 parts of water with two parts of sodium hydrosulfate at 45° C. with the addition of 4 parts by volume of a sodium hydroxide solution of 30% strength.

The stock vat so obtained is added to a solution of 4 parts by volume of a sodium hydroxide solution of 30% strength and 2 parts of sodium hydrosulfite in 2,000 parts of water. In the dyebath so obtained are dyed 100 parts of cotton for one hour at 40 to 50° C. With the addition of 10 parts of sodium chloride. The cotton is then squeezed, oxidised in the air, rinsed, acidified, again rinsed and soaped at the boil. There is obtained a violet dyeing having very good properties of fastness.

What is claimed is:

1. A dyestuff of the formula

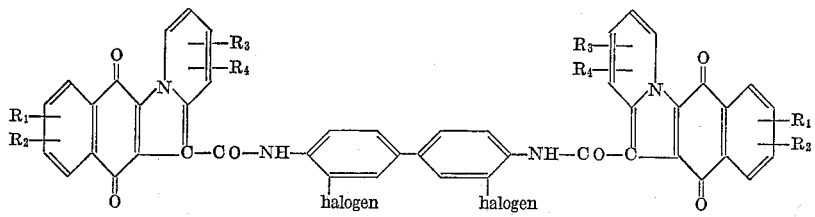

in which $R_1$, $R_2$, $R_3$ and $R_4$ each represents a member selected from the group consisting of hydrogen, halogen and lower alkyl.

2. A dyestuff of the formula

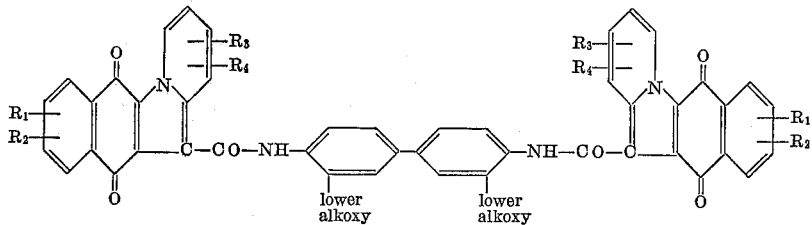

in which $R_1$, $R_2$, $R_3$ and $R_4$ each represents a member selected from the group consisting of hydrogen, halogen and lower alkyl.

3. A dyestuff of the formula

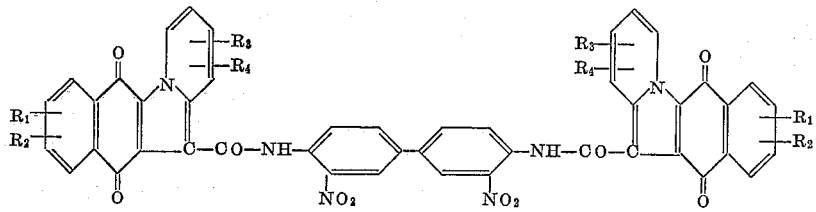

in which $R_1$, $R_2$, $R_3$ and $R_4$ each represents a member selected from the group consisting of hydrogen, halogen and lower alkyl.

4. A dyestuff of the formula

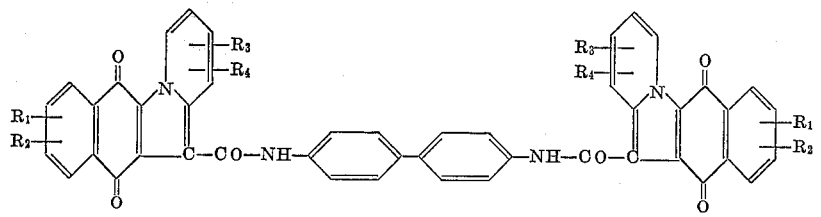

in which $R_1$, $R_2$, $R_3$ and $R_4$ each represents a member selected from the group consisting of hydrogen, halogen and lower alkyl.

5. The dyestuff of the formula

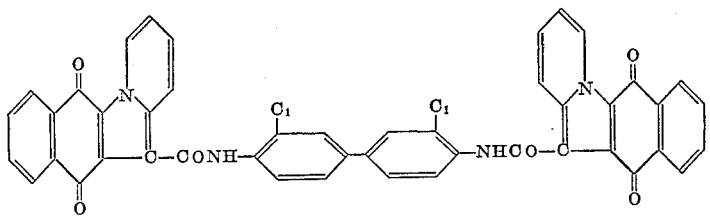

6. The dyestuff of the formula

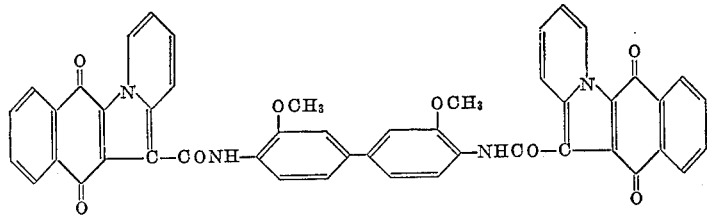

7. The dyestuff of the formula

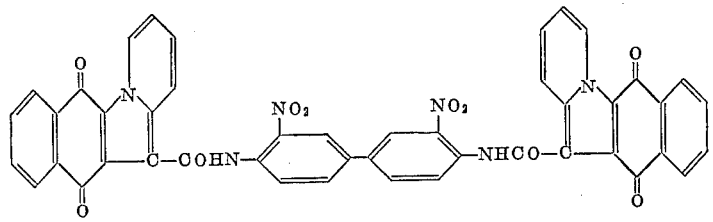

8. The dyestuff of the formula

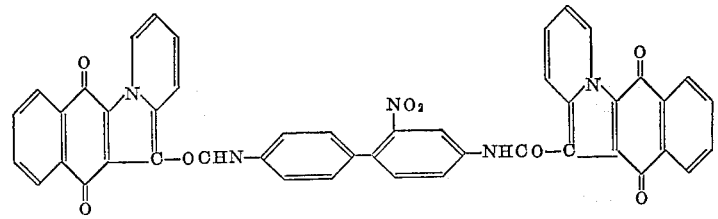

9. The dyestuff of the formula

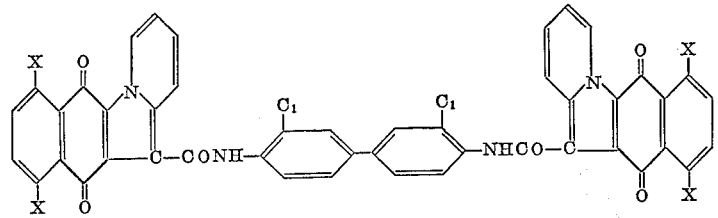

wherein one X of each pair of the symbols X attached to the same carboxylic acid residue is chlorine and the other is hydrogen.

References Cited in the file of this patent

UNITED STATES PATENTS

| | | |
|---|---|---|
| 2,772,274 | Schmidt-Nickels et al. | Nov. 27, 1956 |
| 2,773,873 | Randall et al. | Dec. 11, 1956 |
| 2,877,230 | Long et al. | Mar. 10, 1959 |

OTHER REFERENCES

Noller: Chemistry of Organic Compounds (1957), p. 549 (Saunders).

UNITED STATES PATENT OFFICE
CERTIFICATE OF CORRECTION

Patent No. 3,057,870　　　　　　　　　　　　　October 9, 1962

Eduard Moser

It is hereby certified that error appears in the above numbered patent requiring correction and that the said Letters Patent should read as corrected below.

Column 3, line 15, for "substratem" read -- substratum --; column 4, line 39, for "benezene" read -- benzene --; column 7, the center part of the formulae of claims 5 and 9, should appear as shown below instead of as in the patent:

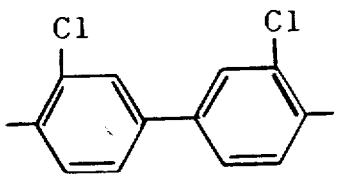

Signed and sealed this 17th day of September 1963.

(SEAL)
Attest:
ERNEST W. SWIDER
Attesting Officer

DAVID L. LADD
Commissioner of Patents